United States Patent Office 3,780,007
Patented Dec. 18, 1973

3,780,007
POLYMERIZATION OF VINYLIDENE FLUORIDE
IN AQUEOUS SUSPENSION
John P. Stallings, Mentor, Ohio, assignor to Diamond
Shamrock Corporation, Cleveland, Ohio
No Drawing. Continuation-in-part of abandoned application Ser. No. 887,754, Dec. 23, 1969. This application Jan. 6, 1972, Ser. No. 215,938
Int. Cl. C08f 3/22
U.S. Cl. 260—92.1 R 11 Claims

ABSTRACT OF THE DISCLOSURE

An improved process for polymerizing vinylidene fluoride in aqueous suspension utilizes reaction pressures attained by the application of hydrostatic pressure in addition to that exerted by the monomer at the reaction temperature. The hydrostatic pressure is supplied by the periodic injection of sufficient quantities of water to maintain liquid-full reactor conditions throughout the reaction and to compress and densify the gaseous monomer to a degree which continuously assures its uniform dispersion in the aqueous reaction medium. Optimum yields of high molecular weight, highly crystalline polymer product are obtained from batch processes in 0.5 to 6 hours. The process is easily adapted to the continuous production of poly(vinylidene fluoride).

BACKGROUND OF THE INVENTION

This application is a continuation-in-part of copending application Ser. No. 887,754, filed Dec. 23, 1969, now abandoned.

This invention relates to useful, easily processed vinylidene fluoride polymers, i.e., poly(vinylidene fluorides). More particularly, it relates to an improved process for polymerizing vinylidene fluoride monomer in aqueous suspension whereby optimum yields of highly crystalline polymer product can be obtained in minimum reaction times.

It has long been known that vinylidene fluoride can be converted to high molecular weight polymers in aqueous suspension under extremely high pressures and in the presence of peroxy compounds as initiators. In U.S. Pat. 2,435,537, for example, the use of both inorganic peroxy compounds such as potassium persulfate and organic peroxides such as dibenzoyl peroxide and acetyl peroxide is described. Of the two types of initiators specified in this patent, the organic peroxides generally provide better quality polymers. However, even these initiators usually provide only relatively low yields of polymer, e.g., from 10% to 20% of theoretical conversions, even at extremely high pressures.

In U.S. Pat. No. 3,193,539, there is described the use of a certain organic peroxide initiator, namely, ditertiary butyl peroxide, to provide excellent yields of vinylidene fluoride polymer at pressures in the range of 300 to 1000 p.s.i.g. However, to provide reasonably effective yields of polymer employing this initiator, polymerization temperatures of 120° to 130° C. and reaction times of around 20 hours are required. The high polymerization temperatures involved and particularly the long run times make the use of this initiator commercially unattractive in an aqueous suspension process.

In another issued patent, U.S. Pat. No. 3,245,971, there is described the use of other organic peroxy compounds, i.e., certain dibasic acid peroxides which, like the aforementioned ditertiary butyl peroxide, are capable of promoting vinylidene fluoride polymerization to high conversion at moderate pressures. However, processes employing these initiators also require around 20 hours operation for optimum yields.

I have now found that optimum yields of high molecular weight, highly crystalline poly(vinylidene fluoride) are obtained quickly and economically from an aqueous suspension polymerization process wherein the pressure exerted and maintained on the reaction mixture is effected by the application of hydrostatic pressure in addition to that exerted by the monomer at the reaction temperature. The amount of hydrostatic pressure applied must be sufficient to maintain the reactor throughout the reaction liquid-full, i.e., filled with a uniform dispersion of compressed and densified monomer in the continuous aqueous phase. The vinylidene fluoride polymer products obtained are predominantly linear in structure. They exhibit a higher degree of crystallinity than poly(vinylidene fluorides) known in the art and likewise exhibit improved physical properties. Also, I have found that for most economical operation herein, the free-radical compound required to initiate and sustain the polymerization preferably is fed continuously at a prescribed rate into the polymerization system.

SUMMARY OF THE INVENTION

Accordingly, the present invention comprises polymerizing vinylidene fluoride in suspension in an aqueous medium substantially as practiced heretofore in the art, with the exception that the superatmospheric pressures utilized are maintained with pressurized water, i.e., hydrostatic pressure, in addition to that exerted by vinylidene fluoride monomer at the reaction temperature. Sufficient hydrostatic pressure is supplied to the system to continuously maintain a liquid-full condition in the polymerization reactor throughout the polymerization cycle. Further, to obtain the desired high quality polymer products in the highest possible yields, the amount of free-radical generating organic peroxy compound is preferably supplied to the system continuously at a prescribed rate rather than being charged totally at the start of the reaction.

A particular advantage of the process of this invention is that it consistently provides high conversion of monomer to polymer in a much shorter reaction time than has been possible heretofore, whether employing either the high pressure processes or the low pressure processes now known in the art. Most important, the vinylidene fluoride polymer products of this invention exhibit greater crystallinity than the prior art polymers. That these polymers are predominantly linear in structure is evident. Thus, the process of this invention presents both an economical, commercially attractive method for the preparation of vinylidene fluoride polymers and also produces polymers possessing improved properties over prior art materials.

DESCRIPTION OF THE PREFERRED EMBODIMENTS

The term "liquid-full" as used herein is intended to refer to the condition that the reactor throughout the polymerization reaction is filled with a uniform dispersion of compressed monomer (which also may be correctly designated at the reaction conditions employed as monomer in the form of compressed vapor or liquid or, if maintained above its critical temperature, as compressed fluid) in a continuous phase which is the aqueous reaction medium.

Compression or densification of the monomer to the degree that it is amenable to being uniformly dispersed in the aqueous medium is effected by the application of hydrostatic pressure to the polymerization system in addition to that exerted by the monomer at any particular reaction temperature.

In practice of the process, it has been found that at any specific reaction temperature, the overall reaction pressure employed must compress the monomer sufficiently so that the difference between its relative density and that of water is no greater than 0.50 g./cc. (The relative density of water decreases from about 0.996 g./cc. at 30° C. at one atmosphere to about 0.951 g./cc. at 110° C. at 1.4 atmospheres.) As reported by Mears, W. H.; Stahl, R. F.; Orfeo, S. R.; Shair, R. C.; Wells, L. F.; Thompson, W.; and McCann, H., "Thermodynamic Properties of Halogenated Ethanes and Ethylenes," Ind. Eng. Chem., vol. 47 (7), 1449–1454 (1955), the critical temperature of vinylidene fluoride monomer is 30.1° C., its critical pressure is 643 p.s.i.g. and its critical density is 0.417 g./cc. Accordingly herein, at a reaction temperature of 30° C., the reaction pressure must be greater than 643 p.s.i.g., i.e., at least about 700 p.s.i.g. to effect densification of the monomer sufficiently so that the difference between its relative density and that of water at 30° C. will be no greater than 0.50 g./cc. As the polymerization temperature is increased, the reaction pressure required to maintain the desired monomer density is correspondingly higher. Thus, at a reaction temperature of 55° C., for example, the reaction pressure which will maintain the monomer at the desired density typically is 1150–1200 p.s.i.g. At 90° C., the reaction pressure required to maintain the desired monomer density is at least about 1650 p.s.i.g. Periodic additions of sufficient water to maintain the required reaction pressure and desired monomer density will correspondingly maintain liquid-full reactor conditions as defined herein. It is to be noted that the volume of water added during the reaction quite accurately indicates the extent of the polymerization.

Except for the condition that the reaction pressures utilized are supplied by hydrostatic pressure in addition to that exerted by the monomer at the reaction temperature and that the overall reaction pressure is sufficient to maintain liquid-full reactor conditions throughout the reaction, the aqueous suspension process of this invention can be said to be generally carried out substantially as practiced heretofore in the art. That is to say, the vinylidene fluoride monomer, while maintained in aqueous suspension with the aid of a dispersant or suspending agent, is contacted with an organic peroxy compound which will generate sufficient free-radicals at the polymerization temperature employed to initiate and sustain the reaction. In practice herein, it has been found that compounds most suitably employed in processes wherein the total initiator required is introduced at the start of the reaction are those organic peroxy compounds with "half-lives" of up to 1000 minutes at the polymerization temperatures utilized. By "half-lives" or "half-life" as used herein is meant the number of minutes required, upon exposure of a compound to any particular temperature, to exhaust 50 percent of its free-radical generating capacity.

In processes herein in which the amount of initiator required is added continuously throughout the reaction, organic peroxy compounds with "half-lives" of from 2 to 10 minutes within the polymerization temperature range are most suitable. Usually, by this method, an aqueous suspension of the desired initiator is introduced into the reactor at a rate ranging from 0.0001 g. to 0.001 g. initiator/100 g. monomer/minute. The continous mode of initiator addition is preferred at this time as optimum yields of polymer product may be obtained in the shortest reactions times with less overall initiator requirements. The resulting products, retaining less residual initiator, are correspondingly more thermally stable.

In processes which are operated continuously by any known methods for the continuous production of polymer product, initiators having "half-lives" of from 1 to 60 seconds can be effectively employed.

Specific organic peroxy compounds suitably employed herein include diisopropyl peroxydicarbonate, tertiary butyl peracetate, tertiary butyl peroxypivalate, di(sec.-butyl)peroxydicarbonate, diisobutyryl peroxide, acetyl cyclohexane sulfonyl peroxide and tertiary butyl perbenzoate. The total amount of initiator employed, based on the weight of the monomer, ranges generally from 0.01 to 5.0 percent with an amount ranging from 0.03 to 1.0 percent being usually satisfactory and preferred.

Aside from the initiator, other ingredients of the polymerization formulation include the dispersant or suspending agent and optionally a chain transfer agent. No buffer compounds are needed to assure the proper pH of the system. In general, any suspending agent previously employed in polymerization processes for ethylenically unsaturated monomers may be used herein provided it remains undecomposed at the polymerization temperature. Specific suspending agents preferred at present, however, include methyl hydroxyalkyl cellulose, e.g., methyl hydroxypropyl cellulose, and polyvinyl alcohol. The amount of suspending agent used ranges from 0.0001 to 1.0 percent, by weight of the monomer charge.

As previously mentioned, a chain transfer agent optionally may be used in the process. In some formulations, the particular type and level of initiator utilized in combination with a particular polymerization temperature will yield a product having an average polymer molecular weight higher than desired for the processing conditions and end-use application intended. Therefore, by also including minor amounts of a chain transfer agent in such polymerization formulations, it is possible to regulate the average molecular weight of the polymer product for the application desired. Suitable chain transfer agents employed include lower aliphatic, i.e., $C_{1-4}$ alcohols, e.g., methanol, ethanol, isopropanol and isomeric butanols and lower aliphatic ketones, as acetone. Of these, isopropanol is preferred at present. An amount of chain transfer agent ranging from 0.1 percent to 10.0 percent, based on monomer weight, generally may be used. Depending upon the type of weight distribution desired in the product, it may be introduced effectively into the polymerization mixture totally at the start of the reaction or at a prescribed rate continuously as polymerization progresses.

Suitable water to monomer ratios in the reaction mixture generally may vary from 1:1 to 4:1, with ratios of 1.5:1 to 3:1 being most satisfactory and preferred at present.

In general, the polymerization reaction herein may be carried out at temperatures ranging from 30° C. to 110° C. In batch-type operations, the reaction is conducted for a time period of 0.25 hour to 6 hours, depending upon the particular initiator employed. Preferably, it is conducted at a temperature of 55°–100° C., and still more preferably at a temperature of 70°–95° C. for time periods of from 1.5 hours to 4 hours. The reaction pressure utilized ranges generally from about 700 p.s.i.g. to 5000 p.s.i.g., preferably from 1000–3000 p.s.i.g.

When carrying out the process of this invention continuously, reaction temperatures of 50°–100° C. are presently most advantageously employed, utilizing a minimum reaction pressure of about 1100 p.s.i.g. Under these conditions, the residence time of the monomer in the reactor typically ranges from 2 minutes to 15 minutes, depending upon the half-life of the particular initiator employed.

By the process of this invention, it is possible to prepare high molecular weight poly(vinylidene fluorides) in optimum yields, i.e., greater than 85 percent conversion, in much shorter reaction times than possible heretofore in the art. Further, in the presently preferred embodiments of the process wherein the initiator requirement is added continuously at a prescribed rate to the polymerization system, the total amount of initiator needed to sustain the reaction to completion is much reduced by comparison to initial one-charge initiator practices. Therefore, the practice herein of continuous initiator addition offers a more economical method than prior art processes for preparing vinylidene fluoride polymers. Of course, it can be readily appreciated that with reduced quantities of initiator used, less residual initiator will be occluded in the polymer particles, thus yielding a polymer product of optimum stability.

Data obtained from numerous analytical methods described more fully hereinafter indicate that the vinylidene fluoride polymer products of this invention possess a greater degree of crystallinity than similar type polymers now available in the art. Correlation of these data also indicates a more linear, less branched structure in the polymers of the invention. Comparative physical property measurements further show these polymers to be stronger, more chemically resistant and more thermally stable than prior art polyvinylidene fluoride resin.

One analytical method utilized herein to characterize the structure of the polymers of this invention is differential thermal analysis (DTA), or thermal spectrometry, which technique measures the heat-energy change occurring in a substance as a function of temperature, when both the substance and an inert reference material are heated side by side at a uniform rate. For the test, the instrument used was a Perkin-Elmer Differential Scanning Calorimeter, Model DSC-1. The polymer sample was loaded into a sample pan and placed in one of the two sample holder assemblies. An empty sample pan was placed in the other sample holder assembly as the reference materials. Electrical power was applied to both sample holders to raise the temperature of each at the same rate, 20° C./minute. The power required to maintain both the sample and reference at the same temperature was recorded on a strip chart by means of an interval marker.

When the sample underwent a thermal transition (endothermic), the instrument adjusted the power required to keep both the sample and the reference at the same temperature. The power differential occurring was likewise recorded on the chart. The thermogram obtained is ssentially a heat capacity curve, indicating the heat of fusion, $\Delta H f$, required to melt the polymer. Using this procedure, it is found that the minimum $\Delta H f$ for the polymers of this invention is 14 calories/gram of polymer. By the same procedure, the $\Delta H f$ determined for prior art poly(vinylidene fluorides) ranges between 8–13 calories/gram of polymer. Since the heat of fusion is greater for the polymers of this invention than for the prior art materials, the polymers of this invention accordingly have a greater degree of crystallinity.

Another method utilized herein to determine the relative crystallinity of the polymers of this invention and prior art vinylidene fluoride polymers, on a comparative basis, was an X-ray diffraction technique, measuring that percentage of the X-ray diffraction pattern of the polymer which is contributed by the crystalline portion thereof. The instrument used was a Phillips X-ray Diffractometer. For each polymer, the overall diffraction pattern was first obtained. The diffraction pattern of the noncrystalline polymer, i.e., the amorphous halo, was then obtained by a diffraction study of the polymer in a melted, disordered state. The initial X-ray pattern was then superimposed over the amorphous halo. A background line was drawn between minima points of the diffraction patterns. The area lying under the crystalline peaks and above the noncrystalline peaks was measured. The ratio of this value to the total area above the background line, multiplied by 100, yields a value designated as the relative percent crystallinity of the polymer. Using this procedure, average relative crystallinity values of at least 60 percent are obtained for the polymers of this invention. Average relative crystallinity values of only 35 percent are obtained for prior art vinylidene fluoride polymer materials.

Analysis of the polymers of 94.1 mHz. $F^{19}$ high-resolution nuclear magnetic resonance (NMR) has also been employed herein to provide an indication of their comparative chain structure and composition. The procedure followed was as described generally in Wilson III, C. W. and Santee Jr., E. R., "Polymer Analysis by High-Resolution NMR with Applications to Poly(Vinylidene Fluoride) and Poly(Vinyl Fluoride)," Part C, Journal of Polymer Science, No. 8, 97–112 (1965). For each analysis, the polymer was examined in solution in acetophenone at a temperature of 170° C., employing a $CFC_3$ internal reference. The instrument was set at maximum amplification with a sweep time of 500 seconds and a frequency response of 0.5 Hz.

All of the spectra obtained show the presence of observable peaks at 90.7, 91.6, 94.8, 113.6 and 115.9 p.p.m. These peaks are assigned to the chemical shift differences arising from the four possible sequences of C atoms surrounding a particular $-CF_2-$ group in the polymer chain, such sequences resulting from normal head-tail addition and also when a monomer unit is added head-to-head (or tail-to-tail) occassionally.

In addition to the aforesaid peaks, a peak is observed at 93.3 p.p.m. in the spectra of the Kynar vinylidene fluoride polymers. A similar peak is completely absent, however, in all of the spectra obtained for the polymers of this invention. A peak at 93.3 p.p.m. is presently interpreted as being due primarily to branching of various fluoroalkyl groups from the linear polymer chain. Accordingly, the polymers of this invention, yielding spectra with no evidence of a peak at 93.3 p.p.m., are believed to be less branched, i.e., of more linear structure than prior art vinylidene fluoride polymer materials.

The polymer products of this invention may vary widely in average polymer molecular weight, depending upon the reaction conditions employed and whether or not a chain transfer agent as previously described is employed in the process. Intrinsic viscosity values $[\eta]$ are employed herein to indicate molecular weight. These values are calculated from relative and inherent viscosity values derived from kinematic viscosities measured at 30° C. in accordance with the American Society of Testing Materials Procedure, ASTM D1243–60 (Method A, Appendix), using dimethylformamide as the solvent, and test solutions which contain 0.1 g. of polymer per 100 ml. of solution.

For poly(vinylidene fluoride), an intrinsic viscosity value of 1.0–2.0 corresponds generally to an average molecular weight ranging from 50,000 to 300,000. In most instances, polymers of this molecular weight range may be processed most efficiently for various end-use applications. However, it is to be understood that higher molecular weight polymers obtained herein may also be processed into useful articles without undue difficulty.

As generally practiced, the process of the invention will normally yield products made up of comparatively large particles, essentially of spherical shape. These range generally from about 20–300 microns in size. Within this range, polymers with a particle size predominantly of from 40–240 microns are most frequently produced. Such products generally may be fabricated by conventional extrusion and molding techniques as presently practiced for suspension-polymerized thermoplasts. These polymers are also suitable for the production of fibers and films by melt extrusion or by casting from solution in appropriate solvents.

With minor modification, the process of this invention likewise can be employed to prepare polymers of extremely fine particle or agglomerate size, e.g., in the range of from 0.5 to 5 microns. As known from prior art practices, such finely-divided polymer materials are preferred for use in coating processes whereby a particulate polymer is applied to a substrate as a dispersion in a suitable solvent.

To prepare the finely-divided materials, the process may be carried out essentially as described hereinabove, while simultaneously circulating the reaction mixture through a homogenizing device connected to the reactor, thus imparting an increased rate of shear and impact force to the monomer droplets suspended in the reaction medium. Any of the homogenizing devices now known, e.g., a Manton-Gaulin high pressure homogenizer, a sonolater, or other high-speed dispersion device, may be efficiently utilized herein to effect the desired reduction in monomer droplet size. Also, a simpler arrangement such as a reciprocating piston pump equipped with an adjustable needle valve to control the shearing force applied to the reaction mixture may be employed.

In carrying out the process with homogenization, it may be desirable in some instances to include in the polymerization mixture a surfactant in addition to the suspending agent in order to assure production of polymer products with the extremely fine particle size desired. The choice of any particular surfactant which is generally used in an amount ranging from 0.01–1 percent, by weight of the monomer charge, is not especially critical. For example, it may be selected from common soaps, nonionic detergents, long-chain aliphatic alcohols, ethoxylated long-chain aliphatic alcohols and mixtures thereof.

The finely-divided polymer products produced by the aforesaid modified process of this invention may be employed without comminution in dispersion coating processes as conventionally practiced to produce homogeneous, tough and durable coatings on a wide variety of substrates.

In order that those skilled in the art may more completely understand the present invention and the preferred methods by which the same may be carried out, the following specific examples are given.

Example 1

A one-gallon, baffled and agitated stainless steel reactor rated at 10,000 p.s.i.g. is fitted with a cooling coil, a thermocouple, a pressure gauge, ports for charging ingredients and a rupture disc connected to a vent line. To this reactor is charged with agitation, 30 g. of a 5% methyl hydroxypropyl cellulose solution and then 5.0 g. of tert.-butyl peroxypivalate. The reactor is then successively sealed, purged of oxygen by repeated evacuation, charged with 908 g. of vinylidene fluoride monomer and 2470 ml. of water (800 p.s.i.g. at 25° C.). At this pressure and temperature, the density of the liquid monomer is approximately 0.69 g./cc. The reaction temperature is then raised to 55° C., increasing pressure to 2000 p.s.i.g., with the monomer density remaining constant. The reaction is continued for 4 hours, during which time about 800 ml. of water is pumped into the system to maintain the monomer density constant. The reactor is then cooled, the contents are discharged and the polymer product is isolated therefrom by centrifuging. It is washed well with deionized water and dried under vacuum.

Recovered in 91% of theoretical yield, this product is composed of spherical particles having an average size of 50–120μ.

Example 2

This example illustrates the preparation of a poly(vinylident fluoride) product of this invention with continuous addition of initiator at a prescribed rate. A chain transfer agent is utilized, added initially to the reaction mixture.

The polymerization equipment employed is the same as outlined in Example 1. The stirred reactor is charged with 50 ml. of deionized water containing 1.0 g. of dissolved methyl hydroxypropyl cellulose and 4.7 g. of isopropanol. The reactor is then sealed, purged, and charged with 908 g. of vinylidene fluoride monomer. The reaction mixture is then heated to 90° C. while water is injected into the reactor at a prescribed rate to attain a final pressure of 2000 p.s.i.g. at the reaction temperature (total of 2025 ml. water added). At this temperature and pressure, the density of the dispersed monomer is approximately 0.52 g./cc. An aqueous initiator solution containing 2.0 g. of tert.-butyl peroxypivalate and 0.1 g. of the methyl hydroxypropyl cellulose per 200 ml. of solution is then fed at a rate of 0.4–0.5 ml./minute of reaction time. The reaction is continued until completion, adding a total of 149 ml. of initiator solution (1.63 g. initiator) and also about 825 ml. of water to maintain the monomer at the required density. The total polymerization time is 4 hours.

The polymer product (Polymer A) recovered as described in Example 1, is obtained in 92% yield.

The experiment is repeated essentially as before but with the addition of the chain transfer agent to the reaction mixture continuously at a prescribed rate rather than completely at the start of the reaction. In this procedure, 20 ml. of isopropanol is made up to a 1000 ml. volume with deionized water and the resulting solution is fed to the reactor, as needed, to maintain liquid-full reactor conditions (total of 900 ml. added). The total amount of chain transfer agent added is about 14.0 g. The reaction time is 3 hours. The finished polymer product (Polymer B) is recovered in 94% yield.

Example 3

To examine the relative crystallinity and other allied properties of the polymers of this invention with those of some commercially available vinylidene fluoride polymers, melting points, heats of fusion ($\Delta Hf$), X-ray diffraction patterns and intrinsic viscosities were obtained for the polymers of Examples 1 and 2 above and for two different grades of Kynar resin powder. Kynar is a trademark registered by Pennwalt Corporation for a series of poly(vinylidene fluoride) resins. Results of these determinations are as follows:

TABLE 1

| Resin | $\Delta Hf$,[1] cal./g. | Percent relative crystallinity [1] | $[\eta]$ [1] | Melting [2] point, °C. |
|---|---|---|---|---|
| Product of: | | | | |
| Example 1 | 17.0 | 60 | 4.7 | 173 |
| Example 2(A) | 14.4 | 60 | 1.42 | 168 |
| Example 2(B) | 15.0 | 64 | 1.24 | 169 |
| Kynar: | | | | |
| Grade 451 | 8.1 | 35 | 1.43 | 160 |
| Grade 301 | 11.0 | 35 | 1.40 | 161 |

[1] Determined as previously described.
[2] Peak melting temperature, as determined by differential scanning calorimetry.

The above data indicate that polymers of this invention are, in general, higher in molecular weight and exhibit a higher melting point than the Kynar materials tested. Most important, these polymers are found to be substantially more crystalline than the Kynar resins as indicated by the higher $\Delta Hf$ and percent relative crystallinity values obtained.

Example 4

A British patent specification, No. 1,094,558, issued to Kureha Kagaku Kogyo Kabushiki Kaisha describes the preparation of poly(vinylidene fluoride) via an aqueous suspension technique at 0°–50° C. and low pressure, employing a dialkyl peroxydicarbonate initiator and, as molecular weight regulator, either a ketone of 3–4 carbon atoms, a saturated alcohol of 3–6 carbon atoms or a saturated aliphatic or cycloaliphatic hydrocarbon of 3–12 carbon atoms. To determine the properties of such a polymer product, vinylidene fluoride was polymerized following the procedure exactly as outlined in Example 1 of this patent. The polymer product obtained has an intrinsic viscosity of 1.40 and a $\Delta Hf$ of approximately 13 calories/g. The percent relative crystallinity of this product, determined from its X-ray diffraction patterns as previously described, is similar to the values obtained for the Kynar materials of the previous example.

Examples 5–8

Polymerization runs are carried out in accordance with the process of this invention, employing various suitable initiators as indicated on the table below.

For each experiment, the charging procedure and maintenance of liquid-full reactor conditions are effected as previously described. Also, in each run, the initiator requirement is totally charged at the beginning and no chain transfer agent is included to regulate molecular weight of the product. Results obtained are as follows:

TABLE 2

| | Example | | | |
|---|---|---|---|---|
| | 5 | 6 | 7 | 8 |
| Initiator | Diisopropyl peroxydicarbonate | Acetyl cyclohexane sulfonyl peroxide | Di(sec.-butyl) peroxydicarbonate | Tert.-butyl peracetate |
| Amount of initiator, percent of monomer | 0.11 | 1.0 | 0.55 | 0.44 |
| Suspending agent | (1) | (1) | (1) | (2) |
| Reaction pressure, p.s.i.g. | 2,000 | 2,000 | 2,000 | 2,000 |
| Polymerization temperature, °C | 70 | 30 | 30 | 100 |
| Polymerization time, hours | 1.5 | 5.5 | 2.7 | 5.0 |
| Polymer yield, percent | 96 | 86 | 90 | 85 |
| [η] of product | 3.6 | 1.61 | 4.17 | 1.24 |
| Average particle size of product, μ | 100–200 | 40–120 | 40–150 | 50–25 |

1 Methyl hydroxypropyl cellulose.
2 Polyvinyl alcohol.

Examples 9–11

The polymerization runs set forth in these examples illustrate the variation in polymer average molecular weight obtained by varying the catalyst and chain transfer agent (CTA) concentration, by weight of the monomer charge. In each example, the polymerization temperature is 90° C., methyl hydroxypropyl cellulose is the suspending agent, the reaction pressure is 2000 p.s.i.g. and the reaction time is 3 hours. The initiator employed throughout is tert.-butyl peroxypivalate (1% aqueous suspension) added continuously at the prescribed rate indicated. The chain transfer agent is isopropanol added at the start of the reaction. Results are as follows:

TABLE 3

| Example | 9 | 10 | 11 |
|---|---|---|---|
| Amount of initiator, percent | 0.09 | 0.11 | 0.14 |
| Rate of initiator addition, ml./min | 0.20 | 0.20 | 0.60 |
| Amount of CTA, percent | 1.7 | 0.76 | 0.46 |
| Polymer yield, percent | 82 | 85 | 82 |
| [η] of product | 0.76 | 1.17 | 1.47 |

Example 12

Following the general procedure as set forth in Example 1, a vinylidene fluoride polymer is prepared at 110° C. in a total reaction time of 20 minutes. The initator employed is tert.-butyl peroxypivalate (0.22%, by weight of the monomer charge) which is added at a rate of about 0.5 ml./min. The suspending agent is polyvinyl alcohol. The reaction pressure, 5000 p.s.i.g., is maintained by the addition of 640 ml. of water. The polymer product which is recovered in 91% yield has an average particle size of 50–120μ.

Example 13

The heat stability of polymer products of this invention is determined herein by thermogravimetric analysis in air, at 660° F., using a Stanton Automatic Recording Thermobalance, Hight Temperature Model, having a platinum/rhodium bifilar wound furnace. For each test, 200 mg. of the polymer material is weighed into a 16 mm. x 20 mm. crucible which is then placed on the platform of a movable, heat-resistant cylinder rod connected to the balance mechanism. The furnace of the instrument is preheated to 660° F. and is then moved downward over the polymer sample. Thereafter, during the heat treatment, the temperature of the sample being maintained, its decomposition as measured by loss in weight and the heating time in minutes is automatically recorded. Using this procedure, a polymer product of this invention is found to remain 99.2% stable when heated at 660° F. for 60 minutes.

A commercially available vinylidene fluoride polymer, Kynar 301, is found to remain 98.3% stable when heated under these same conditions. Accordingly, a polymer product of this invention exhibits thermal stability equivalent to the commercial polymer.

Example 14

Strength properties of polymers of this invention are determined according to the ASTM test procedure D638–64T, employing injection molded specimens prepared with a cylinder temperature of 450° F., a mold temperature of 100° F. Specimen samples of a Kynar resin are similarly prepared and tested. In these tests, the pull rate is 0.2 inch/minute throughout. Results are as follows:

TABLE 4

| | Resin | | | |
|---|---|---|---|---|
| Property | Product of Example 2(A) | Product of Example 10 | Product of Example 2(B) | Kynar 451 |
| Tensile yield strength, p.s.i. | 7,050 | 6,680 | 6,900 | 6,200 |
| Ultimate tensile strength, p.s.i. | 9,190 | 6,900 | 6,200 | 6,340 |
| Tensile modulus, p.s.i. | $288 \times 10^3$ | $239 \times 10^3$ | $236 \times 10^3$ | $173 \times 10^3$ |
| Elongation at break, percent | 19 | 132 | 82 | 43 |

To determine the flow characteristics of the above resins by comparison to the commercial resin as an indication of their processing efficiency, the melt rheology of each of the above resins is determined in a Sieglaff-McKelvey Capillary Rheometer at 250° C. and a shear rate of $10^3$, sec.$^{-1}$, using a capillary 1-inch long, 0.040 inch in diameter. Results are as follows:

Table 5

| Resin sample | Melt viscosity, poises |
|---|---|
| Product of Example 2(A) | $58 \times 10^2$ |
| Product of Example 10 | $55 \times 10^2$ |
| Product of Example 2(B) | $38 \times 10^2$ |
| Kynar 451 | $62 \times 10^2$ |

The heat deflection temperature of each of the above resins is determined according to ASTM D648–56 at 264 p.s.i. fiber stress. The specimen samples employed range in thickness from 0.125 inch to 0.25 inch. Results are as follows:

Table 6

| Resin sample | Heat deflection temperature at 264 p.s.i. (° F.) |
|---|---|
| Product of Example 2(A) | 178 |
| Product of Example 10 | 178 |
| Product of Example 2(B) | 176 |
| Kynar 451 | 152 |

All of the foregoing test results indicate that when tested under the same conditions, the polymers of this invention are stronger, have improved plasticity at high shear and are less deformable at elevated temperatures by comparison to a commercially available poly(vinylidene fluoride) resin.

Example 15

To further characterize the polymers of this invention by comparison to commercially available poly(vinylidene fluoride), the relative susceptibility of these materials to fracture by shock is determined at 72° F. according to the ASTM procedure, D256–56 (Method A—Notched Izod Test). For the test, specimens are prepared from pelletized resins by injection molding (cylinder temperature=480° F.; mold temperature=200° F.).

The tensile impact energy required to break specimens of the polymers is determined at 72° F. according to ASTM D1822-61T, utilizing Type S specimens. Results are as follows:

TABLE 7

| Resin sample | Izod impact, ft.-lb./in. | Tensile impact, ft.-lb./in.² |
|---|---|---|
| Product of: | | |
| Example 2(A) | 10.3 | 79 |
| Example 2(B) | 1.4 | 51 |
| Kynar: | | |
| 300 | 1.4 | 51 |
| 450 | 3.7 | 54 |

The foregoing results indicate that polymer products of this invention compare favorably with similar commercially available polymers and may, in some instances, possess substantially improved impact strength.

Example 16

For comparison, vinylidene fluoride was polymerized in aqueous suspension, but not under liquid-full reactor conditions in accordance with the process of this invention. A one-gallon, stainless steel reactor was employed, fitted as outlined in Example 1.

The reactor was charged at ambient temperature with 35 g. of a 2% aqueous methyl hydroxypropyl cellulose solution and 4.2 ml. of isopropanol. It was then sealed, purged of oxygen by repeated evacuation and charged with 604.5 g. of vinylidene fluoride monomer. The reactor contents were then heated to 90° C. with stirring while pumping in 1400 ml. of water, whereby the reactor became filled to 70% of volume capacity and the reaction pressure was 900 p.s.i.g. Under these conditions, the density of the monomer was approximately 0.19 g./cc. An aqueous initiator solution containing 1.0 g. tert.-butyl peroxypivalate and 1.0 g. of methyl hydroxypropyl cellulose per each 100 ml. of solution was then fed at a rate of 0.090-0.10 ml./minute of reaction time. The reaction was continued for about 6 hours, adding a total of 290 ml. of initiator solution (2.9 g. initiator).

Upon being cooled, vented and opened, the reactor was found to be significantly fouled, containing a significant quantity of fluffy polymer build-up in the reactor head, on the walls, and on the cooling coil and the agitator. The charging ports were substantially plugged with product which could not be removed with water flushing. Also, the bottom of the reactor had a thin continuous coating of semi-fused polymer with a substantial overlayer of paste-like product.

The foregoing results are in direct contrast to those obtained from the process of this invention whereby optimum yields of high-quality poly(vinylidene fluoride) are consistently obtained in minimum run times and with no reactor fouling. It can thus easily be appreciated that the process of this invention provides to the practioneer a conveniently carried out method for obtaining high quality polymer product at substantial savings both in run time and overall production costs.

It is to be understood that although the invention has been described with specific reference to particular embodiments thereof, it is not to be so limited, since changes and alterations therein may be made which are within the full intended scope of this invention as defined by the appended claims.

I claim:

1. A process for preparing a vinylidene fluoride homopolymer which comprises polymerizing at a temperature ranging from 30° C. to 110° C., vinylidene fluoride monomer in an aqueous suspending medium in the presence of a monomer-soluble- free-radical type polymerization initiator while supplying to the reaction mixture, as the polymerization progresses, sufficient water to maintain a total reaction pressure which continually provides throughout the polymerization reaction, a uniform dispersion of compressed monomer in the aqueous reaction medium, the difference between the relative densities of the water and of compressed monomer in said uniform dispersion being no greater than 0.50 g./cc.

2. The process of claim 1 which is a batch-type process conducted for a time period of 0.25 hour to 6 hours.

3. The process of claim 1 which is a continuous process wherein the residence time of the monomer in the reactor in contact with the polymerization initiator ranges from 2 to 15 minutes and the minimum reaction pressure is about 1100 p.s.i.g.

4. The process of claim 1 wherein the initiator employed exhausts up to 50 percent of its free-radical generating capacity in a time period of 1000 minutes or less at the polymerization temperature.

5. The process of claim 1 wherein the initiator employed is added to the reaction mixture continuously at a prescribed rate ranging from 0.0001 gram to 0.001 gram/100 grams monomer/minute as the polymerization progresses.

6. The process of claim 5 wherein the initiator is tertiary butyl peroxypivalate.

7. The process of claim 2 which is conducted at a temperature of 70-95° C. and a total reaction pressure of from 1500-2000 p.s.i.g. for a time period of from 1.5 hours to 4 hours.

8. The process of claim 1 which is conducted in the presence of a chain transfer agent which is a $C_{1-4}$ aliphatic alcohol or a lower aliphatic ketone.

9. The process of claim 8 wherein the chain transfer agent is introduced into the reaction mixture continuously throughout the reaction.

10. The process of claim 8 wherein the chain transfer agent is isopropanol.

11. The process of claim 1 wherein the initiator is diisopropyl peroxydicarbonate.

References Cited
UNITED STATES PATENTS

| | | | |
|---|---|---|---|
| 2,657,200 | 10/1953 | McGrew et al. | 260—85.5 R |
| 3,475,396 | 10/1969 | McCain | 260—92.1 |

OTHER REFERENCES

Mageli et al., Industrial and Engineering Chemistry, 58, No. 3 (March 1966), pp. 23 and 26-32.

Madge et al., Chem. Abs., 55 (1961), p. 27985h.

Iloff, Chem. Abs. 53 (1959), p. 8713f.

HARRY WONG, JR., Primary Examiner